United States Patent
Amacker et al.

(10) Patent No.: US 9,792,368 B1
(45) Date of Patent: Oct. 17, 2017

(54) DYNAMIC MAP SYNCHRONIZATION

(75) Inventors: Matthew W. Amacker, San Jose, CA (US); Mark A. Ruzon, Mountain View, CA (US)

(73) Assignee: A9.COM, INC., Palo Alto, CA (US)

( * ) Notice: Subject to any disclaimer, the term of this patent is extended or adjusted under 35 U.S.C. 154(b) by 1370 days.

(21) Appl. No.: 12/717,859

(22) Filed: Mar. 4, 2010

(51) Int. Cl.
| | |
|---|---|
| G01C 21/00 | (2006.01) |
| G06F 17/30 | (2006.01) |
| H04L 29/08 | (2006.01) |
| G06Q 30/02 | (2012.01) |
| H04W 4/02 | (2009.01) |
| G06K 9/00 | (2006.01) |

(52) U.S. Cl.
CPC ... *G06F 17/30867* (2013.01); *G06K 9/00671* (2013.01); *G06Q 30/0201* (2013.01); *H04L 67/306* (2013.01); *H04W 4/02* (2013.01)

(58) Field of Classification Search
CPC .......... G06F 17/30867; G06K 9/00671; G06Q 30/0201; H04W 4/02
USPC ................................. 701/400, 426, 438, 440
See application file for complete search history.

(56) References Cited

U.S. PATENT DOCUMENTS

| | | | | |
|---|---|---|---|---|
| 7,432,830 | B2 * | 10/2008 | Behr et al. | 340/995.24 |
| 2005/0033511 | A1 * | 2/2005 | Pechatnikov et al. | 701/210 |
| 2005/0270311 | A1 * | 12/2005 | Rasmussen et al. | 345/677 |
| 2006/0026170 | A1 * | 2/2006 | Kreitler et al. | 707/10 |
| 2007/0191026 | A1 * | 8/2007 | Teplitsky | G01C 21/20 455/456.3 |
| 2008/0312824 | A1 * | 12/2008 | Jung | 701/208 |
| 2009/0289942 | A1 * | 11/2009 | Bailloeul | G06F 17/30256 345/440 |
| 2011/0013014 | A1 * | 1/2011 | Wassingsbo | 348/113 |

* cited by examiner

*Primary Examiner* — Redhwan K Mawari
*Assistant Examiner* — Rodney P King
(74) *Attorney, Agent, or Firm* — Hogan Lovells US LLP

(57) ABSTRACT

Advantages of both conventional and digital maps can be obtained by utilizing a physical map as a type of input to any of various processing devices. In various embodiments, a user can capture an image of a physical map that includes at least one location of interest. The captured image can be matched with stored map information to obtain location information corresponding to the captured image. The location information can be used to provide any of a variety of types of functionality to the user, such as providing navigation directions to that location, displaying information about attractions around that location or statistics about that location, etc. The user in some embodiments can annotate the map to provide additional input, such as areas of interest, exclusion regions, and/or proposed driving routes.

24 Claims, 7 Drawing Sheets

DYNAMIC MAP SYNCHRONIZATION

BACKGROUND

As the cost of mobile devices such as camera phones and global positioning system (GPS) devices continues to come down, there is an increasing number of these devices being used for everyday purposes. For instance, it is becoming more common for people to have at least one device capable of displaying maps and generating driving directions for a specific location. In addition to purchasing physical maps, many users generate maps and driving directions on their home computers and print out this information. Further, users are increasingly utilizing mobile devices to obtain this information in real time. There are disadvantages to each of these approaches in different situations.

For example, a user viewing information on a home computer can look up specific addresses, information about an area, etc., and can use this information to generate maps, routes, etc. The user can also utilize this information to write on or markup physical maps, as may be obtained from any of a variety of sources. Once the user is away from the computer, however, the user has no ability to look up addresses or additional points of interest, and cannot utilize real time features of mobile devices, such as the ability to obtain real-time driving directions. Physical maps still have benefits at such times, however, as a map can be as large and detailed as necessary and can provide a user with a good overview of a location in any direction.

Alternatively, mobile devices such as GPS devices can provide real-time information and can provide maps of local areas, but often do not have the ability to look up addresses of various locations. Without an address, it can be difficult if not impossible to generate accurate directions to a location, or obtain information about that location. Devices such as smart phones can allow users to search for information using Internet-based or similar technologies, but such a process can be time consuming and may not yield the desired results. In cases where a user is in the woods or an amusement park, for example, there might not be an address associated with the intended destination. Further, maps displayed on a mobile device typically are limited by screen size and resolution, such that a user can have difficulty obtaining the desired information without significant effort in scrolling through different screens, zooming at various locations, etc. Most electronic devices also are unable to store information such as comments and annotations on the electronic maps themselves, or store the comments and annotations for subsequent retrieval.

BRIEF DESCRIPTION OF THE DRAWINGS

Various embodiments in accordance with the present disclosure will be described with reference to the drawings, in which.

DETAILED DESCRIPTION

Figure 1:
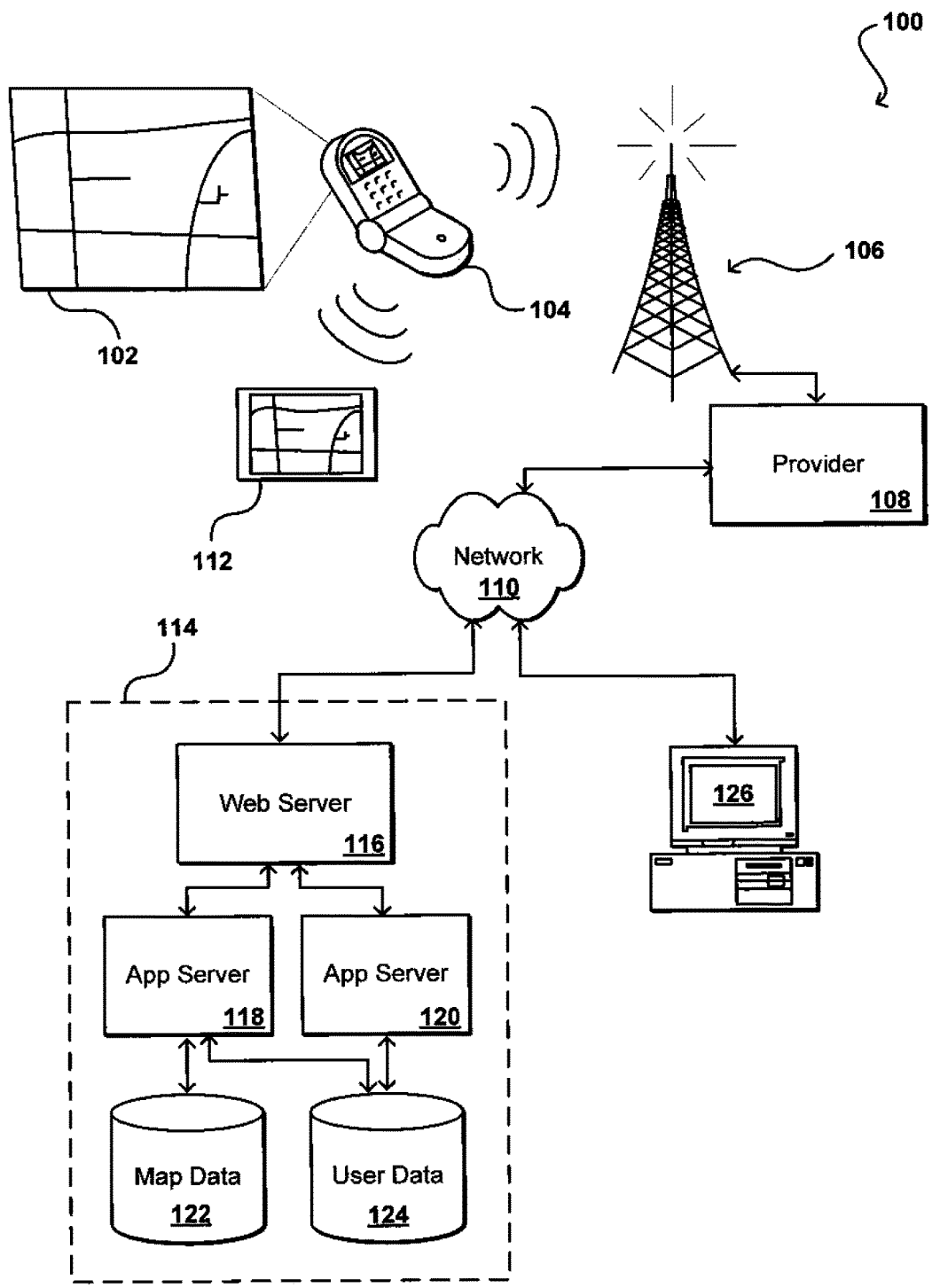
FIG. 1 illustrates an environment in which various embodiments can be implemented.

Systems and methods in accordance with various embodiments of the present disclosure may overcome one or more of the aforementioned and other deficiencies experienced in conventional approaches to obtaining location-based information. In particular, various embodiments utilize captured or scanned images to obtain input from a user regarding current, future, potential, and/or desired locations. These inputs can be used to obtain information about those locations, such as nearby attractions, statistics about a location, nearby hotels, local restaurants, or any other such information. These locations also can be used to obtain information such as driving directions, route options, distances, or any related information.

Systems and methods in accordance with various embodiments can take advantage of the strengths of paper or physical maps, as well as the strengths of digital and/or GPS enabled maps, such as may be displayed on a computing device, cellular phone, or GPS device. Physical maps are useful when performing a task such as planning a trip or buying a new home, as a user can quickly and easily locate and mark those places that the user wants to visit. Due to the large size of the map, the user can also quickly and easily get a sense of all the areas contained within the map. The user can easily annotate the physical map, and due to the ability to view the entire map at one time it is relatively easy for a user to maintain their bearings. Digital maps provide certain advantages not provided by physical maps, however, as digital maps can be generated, updated, and displayed in real time based upon information such as a current location of the user, and they can be used to provide navigation instructions that update in real-time. Digital maps are typically displayed on a relatively small screen, however, such that the user is able to see only a portion of the map at any given time, or is only able to see the entire map at such a high level that the amount of information displayed may be virtually useless. Approaches described and suggested herein provide a seamless integration that utilizes advantageous aspects of both approaches.

For example, systems and methods in accordance with various embodiments utilize at least one image obtained by a user, such as by a user capturing an image of at least a portion of a physical map using a camera of the mobile device. At least one image recognition process can be used to match the captured image to existing and/or stored map, geographic, or other positional information. The stored map information can include any location-based information that can be imaged, scanned, or otherwise rendered. There may be no restrictions on the content of the stored map image, but there should be enough unique data points in at least some embodiments for the image to be recognized using at least one of the processes described herein. Any annotations provided by the user, either relating to the physical map or the image captured of the physical map, can be analyzed and used to obtain information for the user.

In some embodiments, a device such as a cellular phone or GPS device can provide a current location of the user, such as by using GPS data, triangulation data, or any other appropriate location-determining information. In some embodiments, the current position and a position in the image can be used to generate navigation directions or route options from the current position to a position in the image. In other embodiments where positional information is not available, the user can designate a current location on the map via an annotation or other input mechanism, which can be used to obtain and/or generate various information discussed herein.

Various other uses, mechanisms, and approaches are discussed and suggested herein as are described with respect to the various embodiments.

FIG. 1 illustrates an example of an environment 100 for implementing aspects in accordance with various embodiments. As will be appreciated, although a cellular network and Web-based environment is used for purposes of explanation, different environments may be used, as appropriate, to implement various embodiments. The environment 100 shown includes a client device such as a cellular phone 104, which includes a camera or other imaging element capable of capturing an image of at least a portion of a physical map 102. As should be understood, the map can be a standalone map or a portion of a page in a book, magazine, printout, etc. Further, the map need not be a formal map per se, but can include any appropriate physical medium displaying information that can be used to designate at least one position or location within the scope of various embodiments. The client device can include any appropriate device operable to send and receive requests, messages, or information over an appropriate network, such as a cellular network and/or the Internet, and convey information back to a user of the device 104. Other examples of such client devices include personal computers, cell handheld messaging devices, laptop computers, set-top boxes, personal data assistants, electronic book readers, and the like. The system can include additional or alternative networks as well, utilizing any appropriate network such as may include an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network(s) can be enabled by wired or wireless connections, and combinations thereof. In this example, the client device 104 is a cellular phone that communicates using a cellular signal and protocol that is received by a receiving device 106 and processed by a provider system 108, such as a cellular provider network. The cellular network can, in turn, connect to one or more external systems or services over the same or a separate network 110, such as the Internet.

The provider can, either directly or indirectly, communicate with one or more image matching entities 114 operable to analyze images and/or any other appropriate information uploaded by a user of the mobile device 104. The matching entity can also receive information from other entities, or from the mobile device itself. In this example, the matching entity receives the captured image information over a network such as the Internet to a receiving server or device, such as a Web server 116 for receiving requests and serving content in response thereto, although for other networks an alternative device serving a similar purpose could be used as would be apparent to one of ordinary skill in the art. Further, there can be any of a number of other components in the art, such as routers, switches, and firewalls, that can be along a receiving path as well.

The illustrative environment includes at least one application server 118, 120 and at least one data store 122, 124. It should be understood that there can be several application servers, layers, or other elements, processes, or components, which may be chained or otherwise configured, which can interact to perform tasks such as obtaining data from an appropriate data store. In this embodiment, there can be a first application server 118 that communicates with a map data store 122 to attempt to perform image matching, and a second application server 120 that communicates with a user data store 124 to attempt to perform related functionality, such as to locate information of interest for the user based on the matched image information and/or information for the user. As used herein the term "data store" refers to any device or combination of devices capable of storing, accessing, and retrieving data, which may include any combination and number of data servers, databases, data storage devices, and data storage media, in any standard, distributed, or clustered environment. Each application server can include any appropriate hardware and software for integrating with the data store as needed to execute aspects of one or more applications, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 104 and each application server, can be handled by the Web server 116. It should be understood that the Web and application servers are not required and are merely example components, as structured code discussed herein can be executed on any appropriate device or host machine as discussed elsewhere herein. Further, the environment can be architected in such a way that various functionality can be provided as a service to which a user or application can subscribe.

Each server (and various other devices) typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The example environment also includes at least one administration device 126, layer, or system, allowing a user such as a developer, data administrator, or tester to access and manage various aspects of the system. The administration device 126 can be any appropriate device or machine, such as a desktop computer, workstation, etc. The administration device also can allow an administrator to upload new map images, correlate position information, or perform any of a number of related tasks discussed or suggested subsequently herein.

It should be understood that for various processes there also can be many other aspects that may need to be processed by an application server or stored in the data store, such as for generating page information and validating access credentials. Each data store can be operable, through logic associated therewith, to receive instructions from one or more application servers and obtain, update, or otherwise process data in response thereto. In one example, a user might submit a search request for a certain type of information along with a captured image. In this case, the data store might access user information to verify the identity of the user, and can access preference information to obtain information about types of information that are of interest to the user. The information then can be returned to the user, such as in a results listing on a Web page that the user is able to view via a browser on the user device 104. Information for a particular item of interest can be viewed in a dedicated page or window of the browser.

In some embodiments, the mobile device 104 can communicate with another user device 112, such as a global positioning system (GPS) device. The communication can occur directly via a wired connection, over a network, or over a wireless connection such as Bluetooth®. The communication can include various types of information in accordance with various embodiments. For example, in some embodiments the mobile device captures an image and sends the image directly to the GPS device for analysis, while in other cases the mobile device sends information across a network to be analyzed remotely, and the results of the analysis are transmitted to the GPS device, either via the phone or using a separate wired or wireless connection. In some cases, a user can use the mobile device 104 to capture the map image, and the corresponding navigation directions can be displayed on the GPS device. Various other combinations are possible. For example, in some embodiments a GPS device might have a built-in or connected imaging device, such that the separate mobile device 104 is not needed. In other cases, the mobile phone itself might function as a GPS or computing device, such that a separate GPS device is not needed. In some embodiments, a user device such as a home computer can be used to capture and analyze the information, such as by using a webcam or digital camera to capture the image, and the results can be printed via a printer or loaded onto a mobile device. Various other such environments and combinations can be used, as should be apparent to one of ordinary skill in the art in light of the teachings and suggestions contained herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
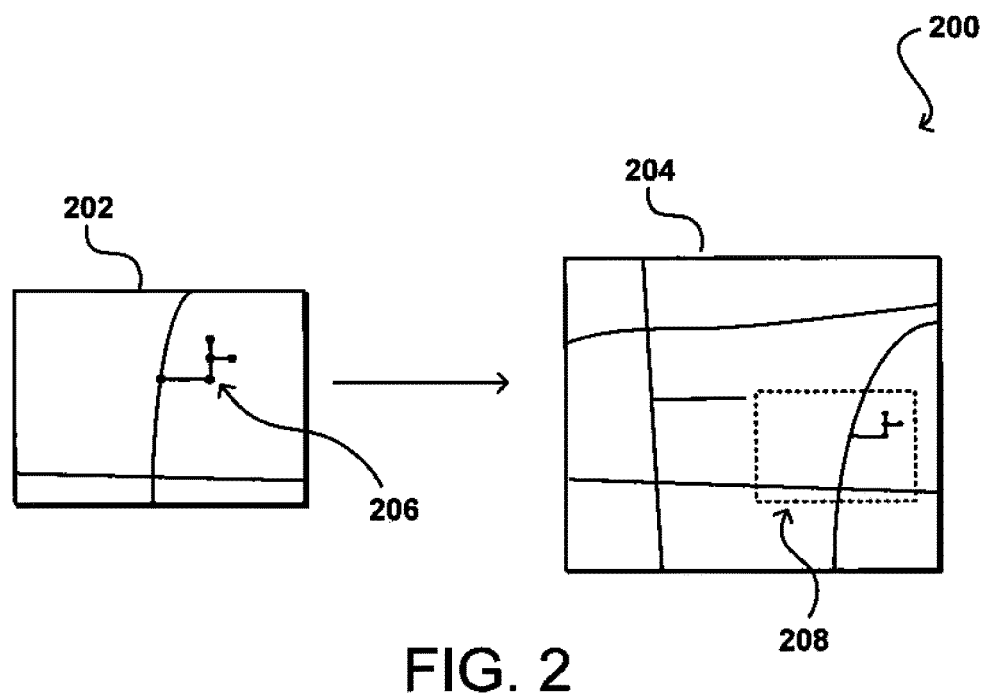
FIG. 2 illustrates an example of an image recognition approach that can be used in accordance with various embodiments.

FIG. 2 illustrates an example of an image 202 that can be captured using a device such as is described above with respect to FIG. 1. In this example, the image represents a portion of a physical map that was captured using a camera of a mobile device such as a cell phone. The image can be processed using one or more image processing algorithms, either on the portable device or using one or more devices to which the portable device transmits the image. In one embodiment, the cell phone uploads the image to a service that includes one or more servers for analyzing the image, such that there is no need for dedicated memory and processing capacity on the cell phone, and the remote servers typically will be able to process the image much more quickly than can a cell phone or similar device, including the amount of time necessary to upload the image. In some cases, an initial analysis can be performed on the mobile device, such as to analyze the image for potentially distinct features. For example, FIG. 2 shows an arrangement of roads that might represent a distinctive feature in the map, and this arrangement of roads can be represented as a set of points 206, feature vectors, segments, or other appropriate information. In order to reduce the amount of information that needs to be uploaded from the mobile phone, or similar device, the searching for potentially distinctive features and capturing of related positional data can allow information other than a full or partial image to be uploaded from device. For example, a mobile phone can analyze an image and extract certain types of features from the image, the information for which can be highly compressed and take up much less bandwidth than typical image information. In other embodiments, the mobile device itself can perform at least a portion of the image analysis, such that only a portion of the processed data (e.g., a set of features vectors) is uploaded to the remote server or device. The analysis of potentially distinctive features thus can be done locally or remotely, or a combination thereof, using any appropriate level of information. Other variations exist, such as to first upload the image to a location capable of determining potentially distinctive features, and then causing the processed data for those features to be uploaded to another source for matching or other analysis.

Once potentially distinctive features have been determined, a representation of these features can be compared to data stored in one or more data stores to attempt to match the distinctive feature to a feature in a map or similar grouping of geographical data. As can be seen in the figure, a digital representation of a physical map 204 can be stored at the remote location (or with the mobile device in some embodiments). In some embodiments, each representation of the map is analyzed, prior to the receiving of information from the mobile device, to attempt to generate representative information (e.g., feature vectors) for each potentially distinctive feature in the physical map. In this way, the information uploaded from the mobile phone can quickly be compared to specific features in a wide variety of maps, without having to do a complex and resource-intensive image-to-image comparison. As illustrated, the image 202 captured by the mobile phone matches a portion of a map 204 for which information is stored at the remote location. A potentially distinctive feature in the image 202 will have a corresponding feature in the image 204 that can be matched to the information from the uploaded image. Based on the matching information, the uploaded image can be correlated with the image 204 stored remotely.

In some embodiments, a minimum confidence threshold must be met in order to correlate the uploaded image or information with stored map information. An exact match may not be required, as any slight variation such as an angle between the camera and the map, a fold in the map, a capture distance, or any other such occurrence can cause the dimensions of the captured image to vary from the dimensions of the scanned image. The matching process can implement a scale component that can handle the actual dimensions, instead looking at relative distances or vectors, but problems such as fold or creases in the map can cause only a portion of the dimensions to be off, such that some tolerance can be allowed for variations. In some cases there will not be a map that matches an image within an allowed variance, or that meets the threshold. Such an occurrence can be handled in any of a number of ways.

For example, an approach in accordance with one embodiment can select one or more maps with the highest match confidence, or other such value, and provide those as suggestions for the user to confirm. In some cases, the threshold might be dropped and any maps that fall at or above that threshold can be presented to a user. In some cases, an additional analysis process can be performed to attempt to improve the match determination. Such processes will be discussed in more detail later herein.

In order to provide the map information for matching, one or more digital copies of each map can be obtained and loaded into the system. The digital copy can be created by capturing or scanning one or more images, and where necessary stitching those images together to form a single image. A user and/or process then can correlate position information with the stored image information. In other embodiments, the creator of the map might provide a digital copy of the map, along with correlated position information. The map information then can be analyzed to attempt to locate interesting or distinct features that can be matched with features found in images taken by users. Information about each of those features, as well as a mathematical description of the content for the map around each of these points, can be stored to an appropriate data store. The features need not be highways or intersections, for example, but can include features such as map legends and corners of letters on the map. While street features can be desirable as they will generally be similar between maps, the location and font of various labels can make it difficult to match different maps of the same location.

When the user subsequently uploads a picture of at least a portion of a physical map to a server, for example, the server can analyze the query image to attempt to find potentially interesting or unique features in that image. The features can be described mathematically and compared to the descriptions of features stored in the data store. When the server finds at least one matching feature, the query image and map image can be correlated, and a geometric transformation can be obtained to map coordinates of the uploaded image to coordinates of the stored map. The map coordinates can be used to obtain geographic information such as latitude and longitude, and the relative coordinates of any location within that map can be interpolated or otherwise estimated using those coordinates. Once a match and geographic positioning is determined, any appropriate map can be generated with any appropriate annotations, overlays, directions, or other such information.

In various embodiments, the features of an uploaded image are matched with the features in the data store using a vector matching process. Each feature can be represented by a vector. If the same algorithm is used for representing features in the map image and query image, similar feature vectors should be generated for the same features, and corresponding pairs of features can be determined through various algorithms, which in many embodiments can be accomplished in less than a second.

Example processes for performing various stages of feature extraction, image matching, etc., can be found in U.S. patent application Ser. No. 12/319,992, filed Jan. 14, 2009, entitled "System and Method to Describe an Image," which is hereby incorporated herein for all purposes. In some embodiments, the back-end portion of the matching system or service includes a feature extraction stage that attempts to locate distinctive features in each image and represent the surrounding areas as at least one feature vector. For a description of one example approach that can be used with such a stage, see Lowe, David G., "Distinctive Image Features from Scale-Invariant Keypoints," *International Journal of Computer Vision*, 60:2, pp. 91-110, 2004. In other embodiments, algorithms can be used that do not find interesting points but rather specific types of regions from first principles, followed by computing a feature vector representation of the region. An example of such an algorithm can be found in Matas, J. et al., "Robust Wide Baseline Stereo from Maximally Stable External Regions," *British Machine Vision Conference, pp.* 384-393, 2002). The back-end system also can include an image-matching stage where, for each uploaded or captured query image to be matched, a lookup is performed against a data store, or other such repository, to attempt to find matching images. Tree structures can be used to provide a coarse comparison to millions of images very quickly, using a process such as is disclosed in Nistér, David and Henrik Stewénius, "Scalable Recognition with a Vocabulary Tree," *IEEE Conference on Computer Vision and Pattern Recognition*, pp. 1222-1229, June 2006. There also can be a geometric verification stage where image locations of a set of corresponding features in the map image and the query image are verified to be geometrically equivalent by computing a geometric transform that maps points from the query image into points on the map image. Use of such a transform is described, for example, in Hartley, R. I., and A. Zisserman, *Multiple View Geometry in Computer Vision*, Cambridge University Press, 2000. Each of these references is hereby incorporated herein by reference for all purposes.

Figure 3:
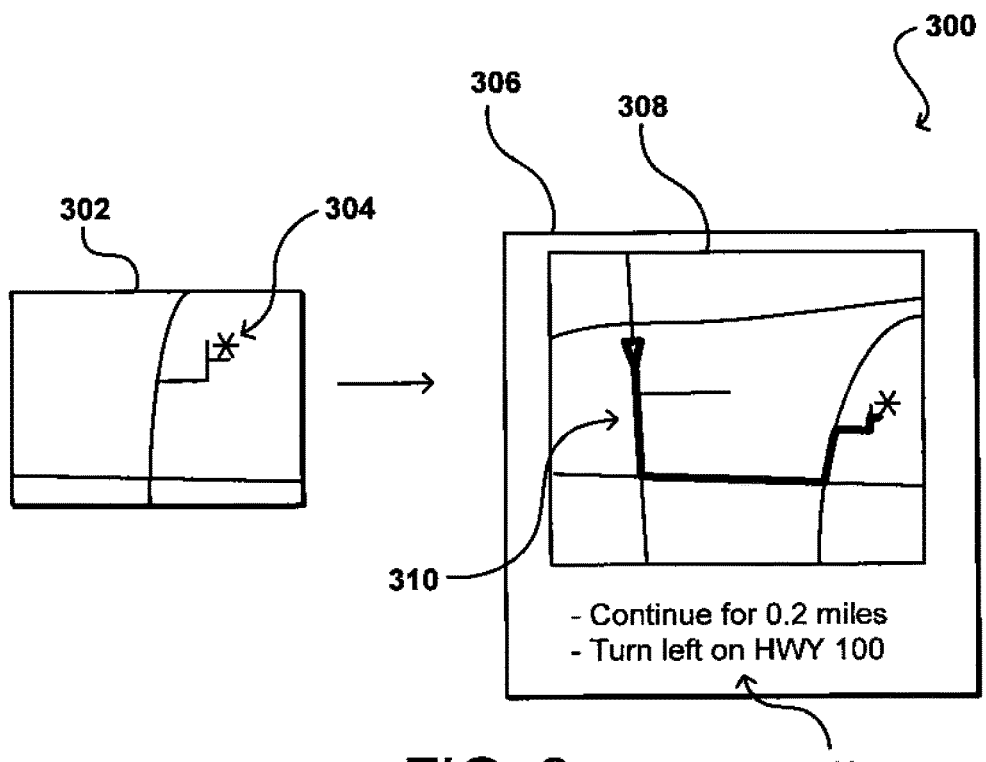
FIG. 3 illustrates an example of a route determination approach that can be used in accordance with various embodiments.

Once a match is determined, the location information can be utilized for any of a number of uses and reasons in accordance with various embodiments. For example, FIG. 3 illustrates an example 300 wherein a user has captured an image of a map 302 that is matched with a map stored at the remote location. A current position of the mobile device can be uploaded as well, either along with the image information or as part of a separate communication. The current position can be determined using any appropriate mechanism as discussed elsewhere herein, such as via triangulation or by utilizing GPS data. In some cases, the remote system can determine the current location using a technology such as triangulation without having to obtain the information from the device itself.

In the present example, the user can designate a location 304 to which the user would like directions from the current position of the user, as may be determined by the mobile device. In some embodiments, the user is able to mark a position on the map before capturing an image, such that the marked position is represented in the captured image. The position can be marked using any of a number of different approaches, such as by drawing a symbol on the map, placing a pin or sticker on the map, pointing to a position using a pen or stylus, using the center pixel of the image, or using any other appropriate mechanism. In some embodiments, different colors can be used to designate different types of position, such as a pin of a specific color to designate a waypoint or an annotation made with a pen of a specific color to designate a destination. In other embodiments, the captured image can be displayed on the mobile device before being uploaded, for example, whereby the user can select a position on the image using a digital mechanism, such as by using an interface tool to indicate a position on the image, using a stylus or other such mechanism to make a digital mark or symbol on the image, etc. In some embodiments the captured image and any digital annotations will be combined into a single image for uploading, while in other embodiments the captured image will be uploaded first, in order to begin the matching process, and information for the annotation can be uploaded separately, either as part of an image or as a set of position information.

In some embodiments a user can capture an image of the map before annotating the map, and can take another picture after annotating the map. Such an approach can be advantageous in examples where there are existing annotations on the map, for example, such that the system can more readily determine the new annotations, although in some embodiments existing annotation information could be stored for specific users for subsequent comparison. Such an approach can, however, be undesirable in certain cases for a number of reasons. First, users would be required to take one or more extra steps, which can degrade the user experience. Further, in embodiments where the images are uploaded to another location, such an approach could require two or more images to be uploaded, which can take significant additional resources and can significantly slow down the processing of the captured images.

After the remote service has determined a match for the uploaded image 302, the service can attempt to correlate the user's current position and the indicated destination location 304 with the matched map information. If such a correlation can be made within an allowable confidence level, or other such criterion, those positions can be used to generate navigation directions to be presented to the user. Systems and methods for generating navigation directions given a start point and an end point are known in the art and will not be discussed in detail herein. Further, the navigation directions can be determined using the same or a different system or service in various embodiments. Once at least a portion of the navigation directions is determined, the information can be communicated back to the user. In some embodiments, this can include sending a map image 308 and driving directions 312 to the mobile phone or other device that captured the uploaded image 302 to be presented as part of a display 306. A route 310 on the map image 308 can also be designated that corresponds to the directions 312. In other embodiments, the information can be sent to another device, such as a GPS device associated with the same user or otherwise designated to receive the information. The information can be transmitted all at once in some embodiments, or can be sent in portions in other embodiments. For example, if the device receiving the information does not have real-time positioning capability, a full set of navigation instructions might be sent to the device in response to the initial request. If the device has real-time positioning capability, the information might be sent in real time, such that the next one or several pieces of information can be sent at any time depending upon the current location of the device. An advantage to sending only the next several instructions is that if the user deviates from the instructions, such as by taking a wrong turn, the navigation instructions can be updated without having to discard all the previously received instructions, which can result in the unnecessary transmission and storage of data. For devices such as cell phones where the user can be charged based on the amount of data transmitted, it can be desirable to minimize the transmission of data that will have to be updated, changed, or otherwise not used.

In embodiments where the start and end points are transmitted to a GPS or similar device, the determining of navigation information can be performed on the GPS device itself. The capturing of the map image and indication of destination information can be used to obtain an address or geographic location of the destination, and once obtained this destination information can be transmitted to the GPS, which can use the current location and known GPS capabilities to provide the navigation instructions or other such information.

Figure 4A:
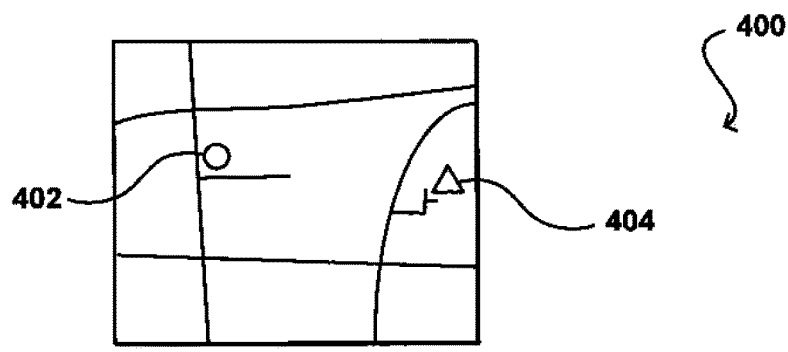
FIGS. 4(a)-4(c) illustrate approaches to marking or annotating maps that can be used in accordance with various embodiments.

Annotations to a map, either before or after image capture, can also serve to provide other types of input in accordance with other embodiments. For example, FIG. 4(a) illustrates an example 400 wherein a first type of symbol, here a circle 402, is added to the map to function as a starting point, and another type of symbol, here a triangle 404, is added to the map to function as a destination. The locations of the annotations can be determined using any appropriate process disclosed or suggested herein, and used for any appropriate purpose discussed herein. A cell phone or personal data assistant (PDA) may not have location-determining capability, such as GPS capability. In such a case, the use of a starting point can enable a user to enter a current location of the user and an intended destination, in order to determine navigation directions to the destination, information about establishments or points of interest between those locations, etc. In another potential situation, the user might want to obtain information about a future trip, which may not involve the user's current location. For example, the user might want to plan ahead for a vacation, where the user knows that the trip will start from a train station or airport, for example, and will take the user to an intended destination. In this example, the user can annotate a map to include a start point and end point, and can obtain information such as potential routes, hotels or restaurants along the way, or any other appropriate type of information discussed herein. In another example, the user might be inside a park that corresponds to a single address, such that the user's current location and destination may not have separate addresses. In this way, the user can mark a starting point, such as the user's car or campsite, and can mark the end point, such as a waterfall or scenic vista, and can obtain route and other such information. In this way, a user can obtain route information that can be looked up on the user's phone during a hike, for example, even if the user is not able to obtain a cellular signal, as the route information can be stored in the phone before embarking on the journey.

Figure 4B:
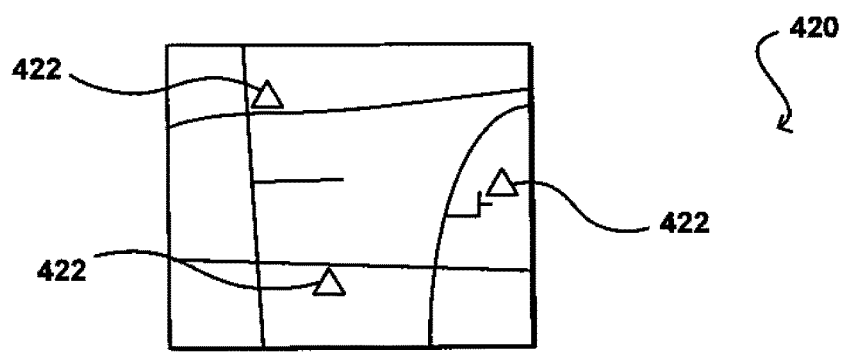

FIG. 4(b) illustrates an approach 420 that can be used in accordance with various embodiments, wherein a user specifies several annotations of the same type, here adding multiple destinations 422 to the map. Such an approach can be useful for a user who intends to visit multiple locations, for example, and would like to obtain information about each and/or determine the best route to follow to visit each, such as may be based at least in part upon a current location of the device. In some embodiments, the user can enter multiple destinations and can receive information such as the closest airport, nearby hotels, etc., in order to determine an appropriate starting point for a vacation or similar journey. A travel application, for example, could utilize such information to determine one or more potential itineraries to visit those locations. For example, if a user from Chicago wants to visit the Eiffel Tower, Tower of London, and the Leaning Tower of Pisa, the application could display to the user an option that has the user fly from Chicago to either London or Rome, and follow a route between those cities that passes through Pisa and Paris. The application also could look at factors such as available direct flights, car rental prices, etc., and can rank the potential itineraries using any appropriate such information. Various other uses for the destinations should be apparent to one of ordinary skill in the art in light of the teachings and suggestions contained herein.

In some embodiments, a user can designate an order in which the user wants to visit the destinations. In one embodiment, the user can rank the order by increasing or decreasing the size of the symbol, such that a larger symbol should be visited before or after a smaller symbol, or by writing a letter or number within each symbol. In some embodiments, the user might use such symbol designations to indicate "must see" destinations and other "possible" destinations, such that a route can be determined, based on factors such as time and opening hours, that includes all of the must see destinations and as many of the other destinations as possible. In some cases, the user can instead rank the destinations on the mobile device once the destinations are recognized. For example, there are three destinations in FIG. 4(b), and the recognition algorithm(s) might recognize the locations and present those destinations to the user on the device for confirmation. In some embodiments, the user can have the ability to rank those destinations on the device using any appropriate mechanism, such as by entering a number or score for each, or by rearranging icons or information for each to establish an order. In some embodiments, the user can also provide input via the orientation of a symbol designation. For example, a triangle or arrow facing upwards in the image could indicate a location of interest, while a triangle or arrow facing downwards could indicate a location that is to be avoided, etc.

In some embodiments, instead of annotating a map with multiple destinations a user can capture multiple images with a desired location near a center of each image. A route to all those locations then can be generated. In some embodiments, the order in which the user takes the image can determine the order of those locations along the determined route. The user can have the option of reordering or excluding specific sites in various embodiments. In some cases, the locations do not have to be on the same map, as long as the system is able to match each captured image with a stored map and appropriate geographic information. This can be advantageous when a user has maps of two cities, for example, but not a map showing roads between the two cities, where the user can image the map at each location and the system can figure out the directions therebetween.

Figure 4C:
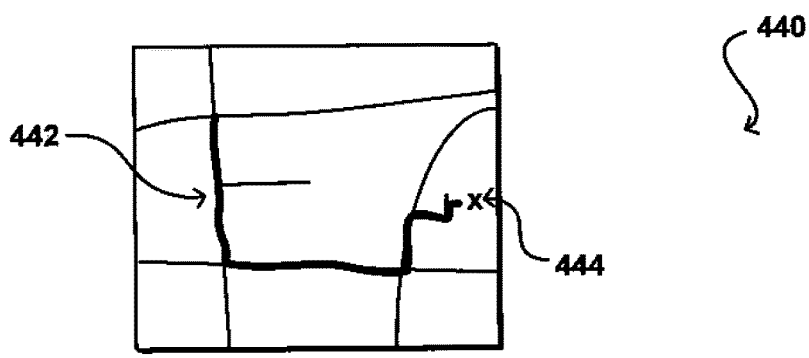

In another example 440 shown in FIG. 4(c), a user might already know the approximate route that the user wants to take. Using the example above, the Chicago traveler might already have determined that the desired route goes from London, through Paris and Pisa, and ends in Rome. The user then can, instead of simply entering destinations, instead indicate the desired route to be taken 442. As with other annotations, the route can be marked on the physical map before image capture, or on an image of the map after image capture. Such an approach can allow the user more control over the type of roads to be taken (e.g., scenic vs. highway), towns to pass through, etc. This information can be used to not only generate and store appropriate driving directions, but can be used to obtain information pertaining to that route, such as available hotels, gas stations, highly rated restaurants, etc., as well as information such as the length of the trip and the estimated amount of time necessary to navigate the route using one or more types of transportation. In some embodiments, the user can store this as a "primary route" to be followed, such that if a user wants to deviate from the route at any point, the user can enter a request to "return to primary route" which can then enable the device to determine the quickest way to get back to the route from the user's current location, for example. In some embodiments the user can designate specific locations 444 along the route to not be skipped, enabling the device to better determine the quickest way to get back to the primary route and onto the next destination, without accidentally skipping an intended destination along the way.

Figure 5:
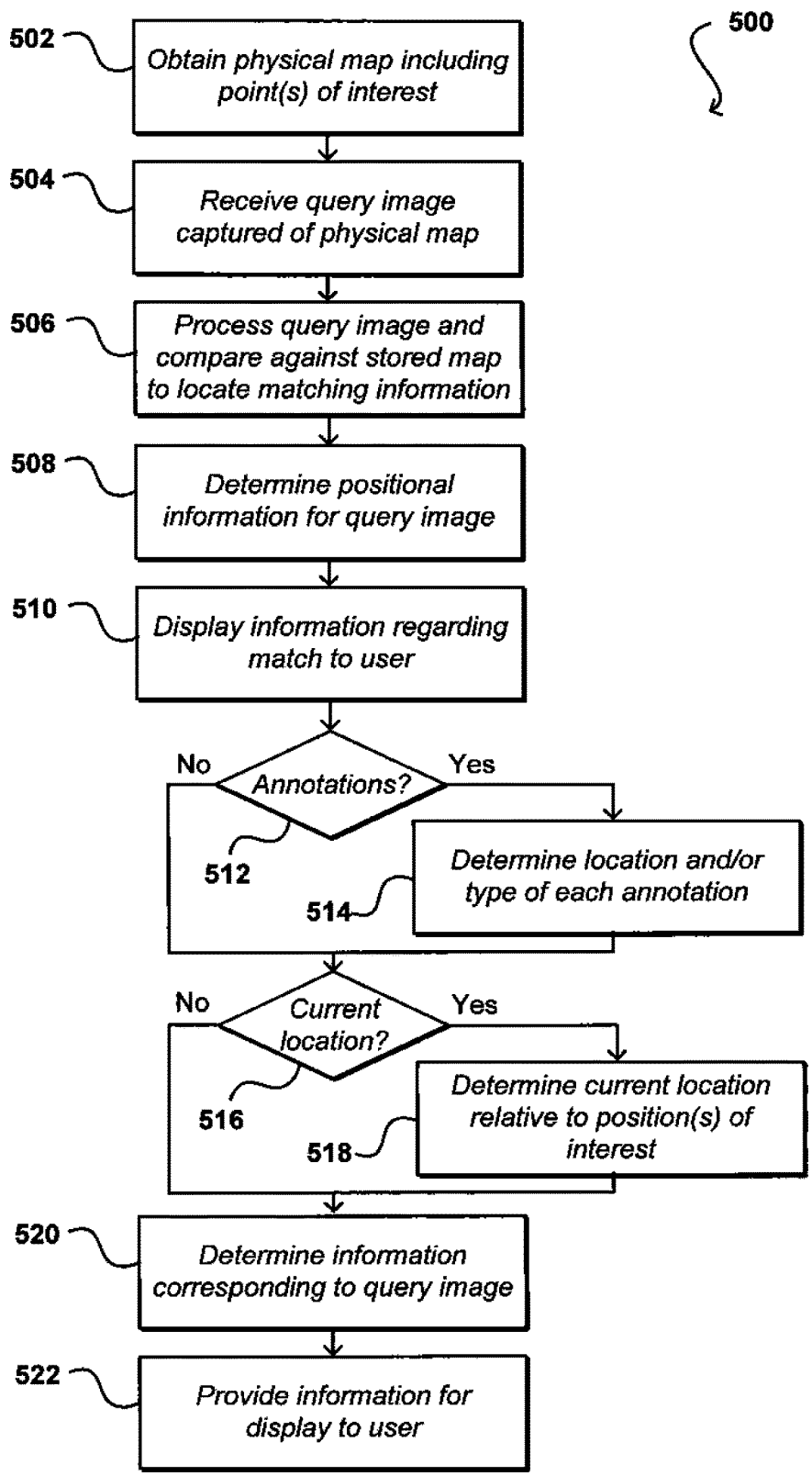
FIG. 5 illustrates an example of a process for analyzing map information that can be used in accordance with various embodiments.

FIG. 5 illustrates an example process 500 for utilizing a physical map to obtain location-specific information that can be used in accordance with various embodiments. As should be understood, the processes discussed herein are examples, and there can be fewer, additional, or alternative steps performed in varying orders, or in parallel, in accordance with various embodiments. In this example, a user obtains a physical map including at least one point or region of interest 502. The user captures an image of at least a portion of the physical map 504, which includes at least one of a current position, future position, or point of interest as discussed herein. The image is processed using at least one image matching algorithm in order to match the image to at least a portion of a map or map information previously stored 506. As discussed, this matching can occur on the device capturing the image or on a remote device, system, or service, wherein the image can be uploaded from the device and analyzed remotely. When a match is found, at least above a specific confidence threshold in some embodiments, positional information corresponding to the map is determined 508, such as by accessing geo-coordinates stored for corners of a map image or as otherwise discussed herein. Information also can be displayed to the user indicating that a match has been determined 508. If a match could not be determined, additional steps can be performed, such as to ask the user to input specific information, capture another image, or select from presented options, etc.

A determination also can be made as to whether the user included any annotations on the map 512. As discussed elsewhere herein, the user can annotate the physical map before capturing the image, annotate the captured image before processing, annotate the matched map image after a match is determined, or using any other appropriate mechanism. If an annotation is located, the location and type of each annotation is determined 514. As discussed, annotations can designate features such as starting points, end points, way points, points of interest, route options, or other such information. A determination also can be made as to whether current location information is available 516. If current location information is available for the mobile device and/or user, and useful for the particular application, the current location can be determined at any relevant point in the process 518. Once the map image has been matched to the captured image, and any current location or annotation information has been determined, information corresponding to at least one of the current location, map location, and annotation information can be determined 520 and presented to the user 522. As discussed, this can include any appropriate information such as navigation instructions, information about a region, information about points of interest, etc. The type of information can depend upon various factors, such as the type of application being accessed, requests from the user, a type of annotation used, or any other appropriate source of information.

Figure 6A:
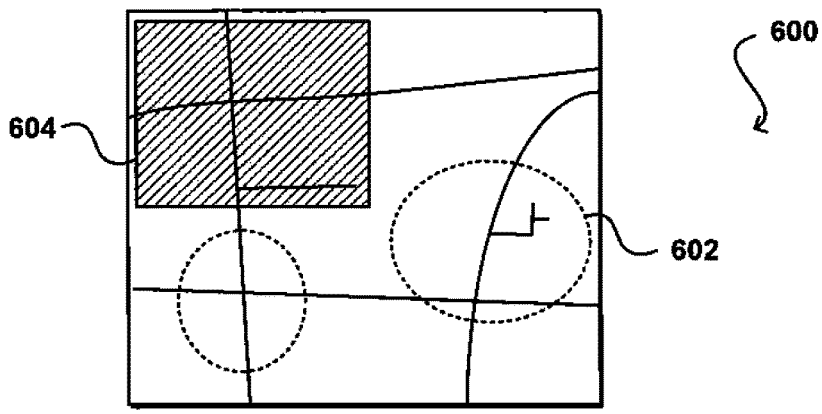
FIGS. 6(a)-6(c) illustrate an example of obtaining information for specific areas that can be used in accordance with various embodiments.

In addition to information such as driving directions, route options, destination information, and other such information, the ability to annotate or otherwise modify map information can be used to obtain information for a variety of other purposes and uses. For example, FIG. 6(a) illustrates an example 600 wherein a user is able to designate areas of interest on a map. In this example, a user is able to designate an area of interest using a circular symbol 602 to surround each area of interest. The user is also, or alternatively, able to utilize a symbol 604 such as hashing, squares, rectangles, cross-throughs, or any other appropriate such symbol or annotation to indicate regions that are not of interest, or that are not to be considered. As should be apparent, a user can use one approach or the other to designate areas of interest or not of interest. By using a combination, a user can designate areas that are primarily to be considered and areas not to be considered, while areas that fall outside those designations might fall into a middle ground that might be considered by the user if no acceptable results can be obtained for the designated primary areas.

Such information can be used for a variety of purposes. In one example, a user might be considering a move to a new location. In this case, the user might want to look for houses in specific areas of a city, or may not want to consider houses in other areas. The user thus can annotate the map as discussed above. In some cases, the annotations can be made or modified by the device (or system or service, for example) based on various criteria. For example, a user might want to look in certain areas, but might not want to live in a school system with financial problems or low test scores, so the bounds of the various annotations can be modified dynamically. In other cases, the user can obtain information pertaining to the regions, such as school information, average housing costs, etc., and can include or exclude certain information or criteria which can cause the areas of interest to be modified. In some embodiments, a user can be provided with a sliding scale of information, such as housing prices, housing sizes, etc., and can cause the areas to be modified based on such information.

In some embodiments, the annotations can be stored for use in future navigation or other determinations. For example, a user might shade a portion of a map to indicate a location which the user would prefer to avoid, such as a dangerous part of town that the user would prefer to not drive through, etc. Similarly, a user might specify portions of town to favor for future determinations. As an example, if the user is searching for a pizza parlor and there is one that is nearby, but there is also one that is in a preferred area within a given distance, the system can select the parlor in the preferred area or present both as potential options. Several other such options can be used as well.

Figure 6B:
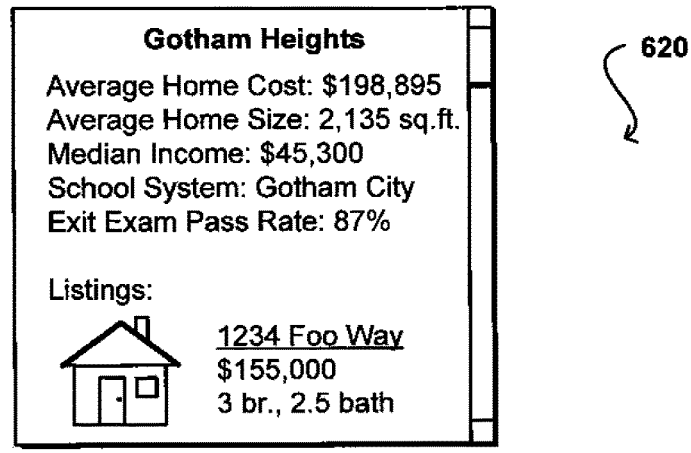
Figure 6C:
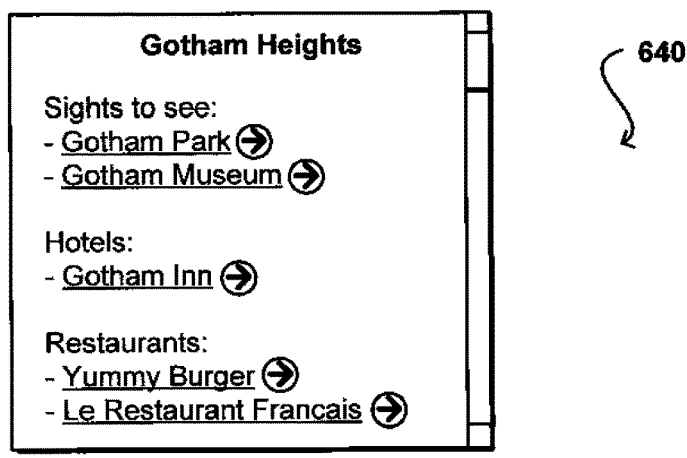

FIG. 6(*b*) illustrates an example of a display 620 that can be provided to a user given an area of interest. In this example, the user has circled an area on the map that corresponds (primarily) to the city of Gotham Heights. The user can be presented with information such as housing information, salary information, school information, etc. If the user is looking for housing, the user can be presented with information such as available housing, with information such as pictures, pricing, details, links to further information, and other such content. If the user is looking for a job in that area, the user can obtain information such as available job listings, information for local companies, etc. Various other types of information can be displayed as well as should be apparent. In cases where a user is looking for housing, the user can select some of the houses displayed, and navigation directions can be generated that help the user to visit those locations.

In another example, a user might circle one or more areas that the user will be visiting, such as a town in which a user will be staying over a weekend. FIG. 6(*c*) illustrates an example display of information 640 that could be provided to the user in such a situation. In this embodiment, the user can be presented with various types of information pertaining to the area of interest, such as sights to see or points of interest, hotels with availability, highly rated restaurants, or other such information. In some embodiments the display can include any relevant information, while in other embodiments the user will be able to select the type of information to display (e.g., type of restaurant or point of interest) and/or classifications or information within each type, such as restaurants or hotels within a particular price range or with a maximum distance away from the route being taken, etc. For each of the locations, the user can select one or more options to obtain additional information, see the location on a matched map image, add the location as a waypoint or destination, etc.

As discussed above, another advantage to being able to capture and annotate map images is that there are locations such as national parks, large box stores, and amusement parks where there can be multiple destinations of interest within a map, but there may be no address associated with those particular destinations. For example, FIG. 7(*a*) illustrates an example of a map of an amusement park 700, which includes an entry point and several different attractions.

When at such a park, the route to an attraction may not be clear if a user is unable to easily determine the current location in the park. In some embodiments, an amusement park might provide a map and actual coordinates of various attractions (e.g., latitude and longitude) such that a user can take a picture of the map, either including the desired attraction or designating the desired attraction, and a current location of the user can be determined to provide navigation instructions from the current position of the user to the front of the line for that attraction.

In some embodiments, the map for the amusement park may not be to scale, and no geographic information might be provided by the park, for example, such that traditional geographic locating and navigating processes might not provide accurate results. For example, the map illustrated in FIG. 7(*a*) is cartoon-like in its presentation, which can be aesthetically desirable and/or appropriate, but as can be seen the rocket ride appears in the map to be about the same size as a pedestrian bridge across a narrow waterway, while the actual ride might be an order of magnitude larger than the bridge. This lack of scale can be problematic for not only directional and positional information, but it can also be somewhat difficult to determine which location the user is actually interested in. For example, a user might be interested in a particular attraction, but if using geographic information such as geo-coordinates at opposing corners of the map, as discussed above, an interpolation of actual geographic coordinates might correspond to a different attraction than what is shown on the not-to-scale physical map. An approach in accordance with one embodiment can address this problem by dividing the map into zones 706, regions, or any other appropriate areas, designated by real or virtual zone boundaries 704, with each of the zones being associated with a particular attraction or other such location. In the example shown, every location within the illustrated zone 706 is associated with an attraction within that zone, here a castle attraction 702. In this way, a user capturing an image centered on zone 706 or annotating any location 708 within this zone 706 can be provided with information about the respective attraction 702. In this example, a user could take a picture of the castle attraction on the map, and can receive information such as the type of ride and current wait time.

Figure 7A:
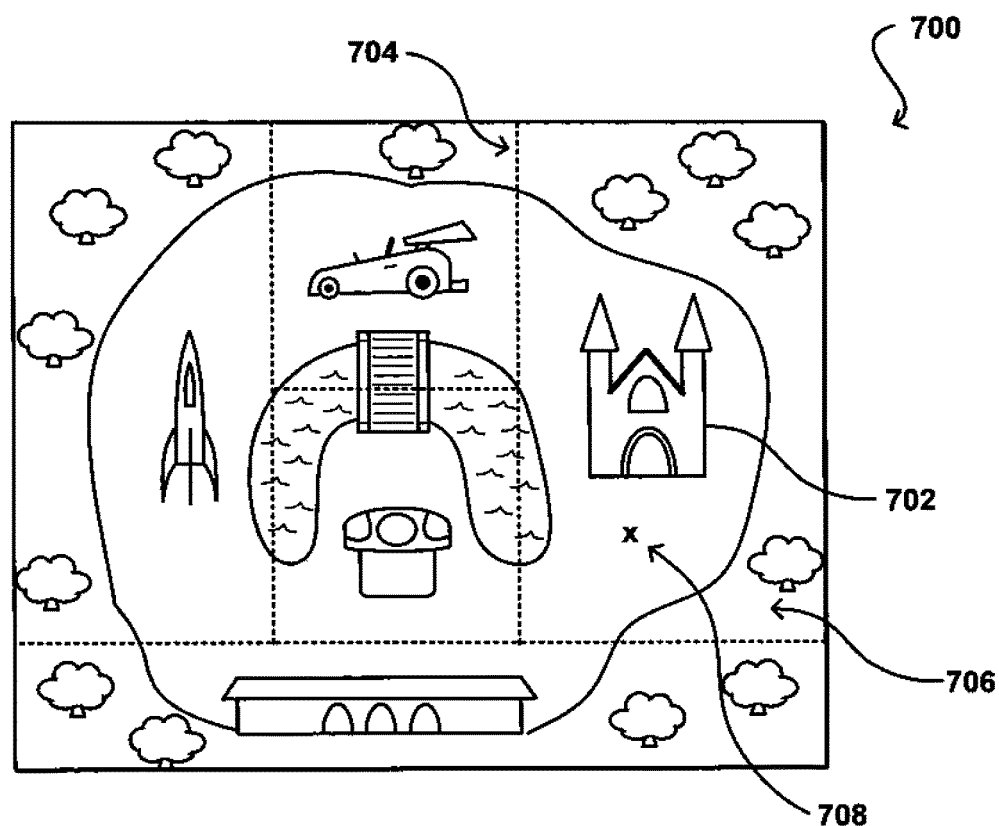
FIGS. 7(a)-7(b) illustrate an example of obtaining information for specific areas that can be used in accordance with various embodiments.
Figure 7B:
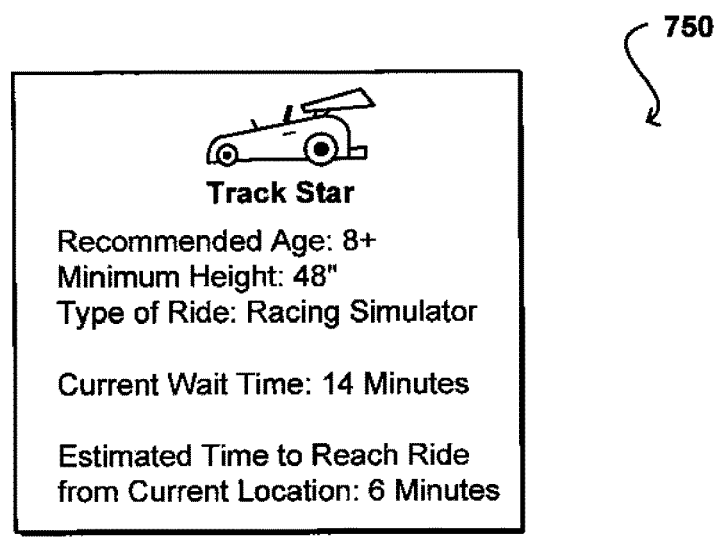

FIG. 7(*b*) illustrates an example of a display 750 that can be presented to a user capturing such an image. In this example, the display shows information about the attraction shown and/or selected in the captured image. In this case, the information includes basics about the ride, such as the type of ride and any recommendations or restrictions to participate. Various other information can also be dynamically determined and/or displayed. For example, the system can determine and transmit a current wait time for the ride, as can be determined using any appropriate technology known in the art for such purposes. Further, the device can use information such as a current location (e.g., actual or "zone-based" as discussed above) to estimate a time to reach the ride from the current location, such as by walking along a designated path, riding a monorail as indicated, etc. In some embodiments, a user might also be able to obtain a number or ticket for the ride, such as a ticket that allows the user to go to the front of the line at a particular time, and the device can track the time, distance, and other such information such that the user can be notified when the user should start heading to the attraction.

Using methods such as those discussed above, a user can also designate ahead of time which rides are priority rides, which attractions can be skipped, etc., via annotating the map before or during a visit. For example, a user can draw circles around attractions that the user wants to visit, and draw Xs through attractions that the user does not want to visit. The user could then take a picture of the map, which could be analyzed to determine the desired attractions. This information can be used in a number of ways. For example, the information can be used to generate a route through the park that will hit all of the desired attractions in the least amount of time. In another embodiment, a mobile device can track the current position of the device, and can notify the user any time the user is within a specified distance of a desired attraction. In another embodiment, the mobile device can display at least an arrow and distance information to the closest ride that the user has designated to visit, such that as the user gets off one ride the user does not have to figure out which way to go next, but can simply use the mobile device as a virtual guide.

Such an implementation also can be desirable from the point of view of the amusement park. The park (or similar venue) can provide real-time information regarding wait times, distances, indicated interests or preferences, etc., and can deliver customized itineraries for various guests. For example, users might most often start at one of the rides near the entrance, and either navigate clockwise or counter-clockwise through the park. In certain embodiments, the user can designate up front which rides the user wants to visit, and the park can analyze information such as current wait information, trends such as waits at particular times of day, distances between rides, and other such information, and can present a customized itinerary to the user that can help the user to maximize time at the park, instead of spending an unnecessary amount of time waiting in line. Such an approach can be beneficial to the park as well, as the number of users in line for a ride at any given time can be reduced, as the visiting by guests can be spread more evenly throughout the day. Thus, not only do the users with the applications not have to wait in line as long, but other guests also can experience lines that are shorter on average. With shorter wait times on average, visitors can experience more rides or attractions, and thus can enjoy the day more and be more likely to make a return visit. Further, the number of visitors can be increased without a corresponding increase in lines, and these visitors also will spend less time in line which can give them more time to engage in other activities, such as eating and shopping, which can be beneficial for both the visitor and the park. Other advantages exist as well, as a park can designate a route that uses a less-commonly traveled path, reducing congestion on specific heavily-traveled routes. In some embodiments, a provider could also direct guests along paths that take them by various restaurants, shops, or other such locations. In some embodiments, the user can designate up front which types of information to be included in the information.

In some embodiments, a user might want to determine the closest restroom in the park, but as discussed cannot rely on accurate position or map information. In such a case, the user might be able to capture an image showing the attraction closest to the user's position, and the user can obtain information about restrooms, restaurants, shops, or other such locations closest to that attraction, or within that zone. Upon selection, the user can obtain directions, menus, items in stock, or any other appropriate information.

As mentioned, a similar approach can be used in other settings as well. For example, a user might want to locate specific items in a large store, such as a warehouse store. If the user is able to obtain a physical map of the store, such as upon entering the store, the user can obtain directions to a specific product, category of products, etc., using any of the approaches discussed herein. In some cases, a user can provide a list of items and, using the map and position information, a mobile device can guide the user through the store such that the user is able to obtain the desired items. The user can also obtain additional information, such as pricing, availability, competitor pricing, or any other appropriate information while the user is in the store. In some embodiments, the user can create a shopping list, and based upon current position information and the captured map information, the device can alert the user whenever the user is near something on the list, whether within a certain distance, within the current store, etc.

In some embodiments, devices for different users can be tied together such that the users can find each other using the devices. For example, if two people are at different places in a park, but at least one of the people is not able to figure out where they are, one of the users can take a picture of the map of the park and, based upon current information for each user determined as suggested herein, the devices (or a separate system) can figure out a way for one person to reach the other, a way for the users to meet at a specific location, etc. In some cases, the user capturing the image can mark on the map a desired place to meet, and each user can automatically obtain directions to that place from their current location.

In certain embodiments, the mobile device can have at least one projection element, built-in or connected, that enables the device to project back onto the paper map. In the example above where a user is attempting to determine the location of another user, the position of one or more users can be determined and then projected back onto the paper map via the mobile device. An initial registration process can be performed, using one or more manual steps or as part of the image recognition process. The position of various users then can be projected back onto the map. The position of various other elements can be projected as well, such as the location of gas stations, restaurants, restrooms, etc. In cases where users might prefer to navigate using a paper map, such an approach can allow the user to easily mark the exact location of various locations of interest on the paper map using the projected locations. In some embodiments, a number of users could be tracked using their respective devices, or any appropriate tracking mechanism, and the location of each of those users could be displayed on the map.

Figure 8A:
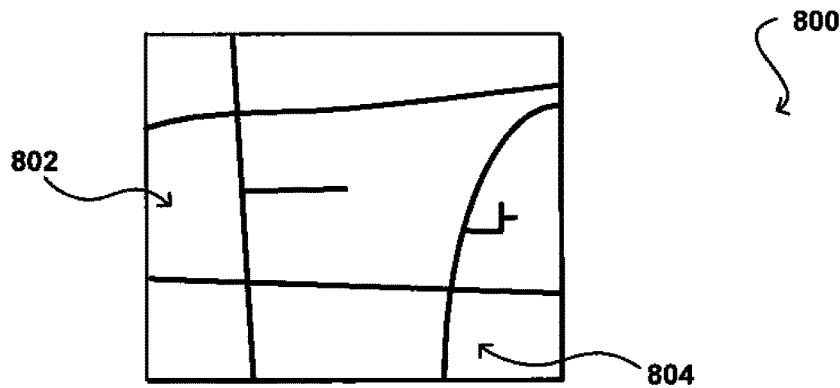
FIGS. 8(a)-8(c) illustrate an approach to determining map annotations that can be used in accordance with various embodiments.

When analyzing a captured image that may have been annotated, the processes of matching the captured image to a map image and recognizing the annotations can be separated into separate steps. For example, in one embodiment an initial process (or process step) attempts to match the captured image to at least a portion of stored information for a map, using any of the number of approaches discussed elsewhere herein. For example, FIG. 8(a) illustrates an example of a map portion 800 that can be stored in memory, that can be used to attempt to match a captured image. The stored map portion is generally free of artifacts such as fold lines and other features that could negatively impact the image matching process. In some embodiments the map is passed through a process that attempts to remove such features, either as an automated process or in conjunction with a human user who can verify that the information to be removed actually corresponds to an artifact and not part of the actual map information.

Figure 8B:
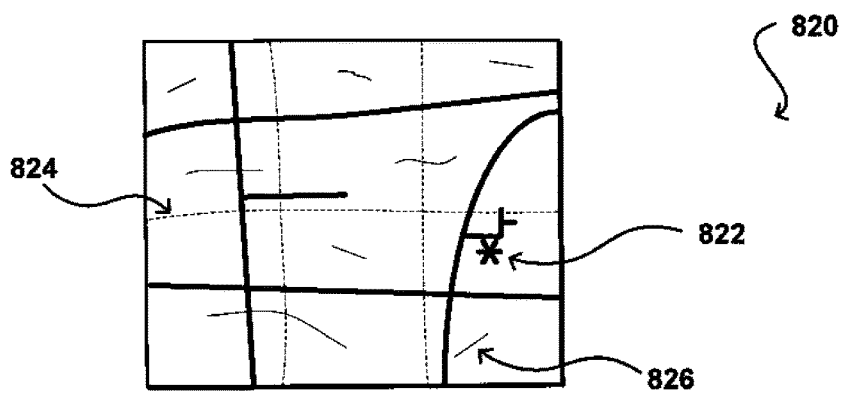

The captured image that is received may correspond more closely to what is illustrated in the example 820 of FIG. 8(b). In this example, it can be seen that the captured image can include a number of features that are not present in the stored image. For example, the captured image can include fold lines 824 at substantially regular intervals of the map. The map also can include various random features 826, such as tears, wrinkles, stains, marks, or other such unexpected features. As discussed above, the captured image also can include one or more annotations 822 that the user may have placed on the map before capturing the image.

As discussed, only one distinctive feature in the map needs to be visible to an extent necessary to match the image to an existing map, such that the presence of folds and other such features may not significantly impact the matching process. For processes that attempt to locate and interpret annotations, however, the presence of these additional features can be somewhat problematic. For example, a symbol 822 composed of an asterisk with three overlapping line segments must be detected and distinguished from the intersection of fold lines, which at least locally form a similar feature. As these fold line can intercept roads and other features in the map itself, it can make the recognition process more difficult. Further, there can be places where six roads intercept, such as at a town center, and these may need to be distinguished from the annotation symbol. Other such situations can exist, such as where a roundabout must be distinguished from a circle annotation about a location, and where a town square must be distinguished from a rectangle drawn around a point of interest.

An approach in accordance with one embodiment attempts to simplify the recognition process by performing a difference operation, wherein the stored map image is "subtracted" from the captured image, such as by doing a pixel to pixel or similar comparison, to produce a single image that illustrates the difference between the two images. As discussed, the captured image can be at an angle, folded, or otherwise distorted with respect to the stored image, so a process can be used to attempt to correlate features and minimize the distortion. In other processes, the slight variations will result in outlines or shadows of features which can be removed or ignored during the analysis process.

Figure 8C:
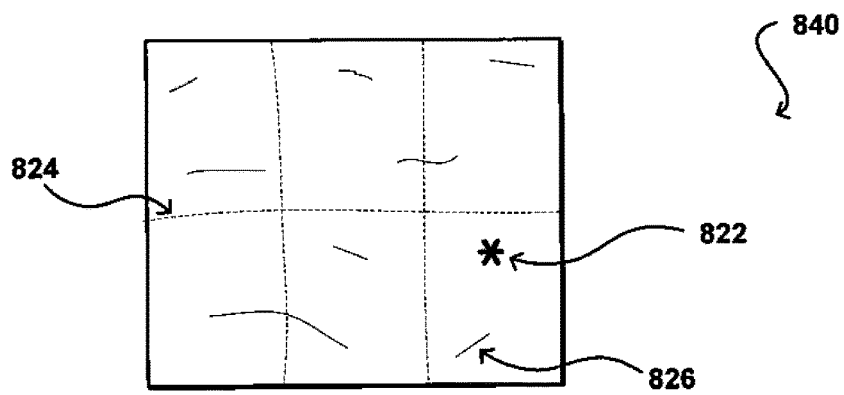

FIG. 8(c) illustrates an example of a difference image 840 that can be produced in accordance with one embodiment. As should be understood, the difference image can comprise image information, and need not result in a full traditional "image" as could be displayed to a user. A decent difference image, as illustrated in the figure, would not significantly show the features in the stored map, but would only substantially show the additional features, including any fold lines 824, annotations 822, and other random features in the image 820. Processes can attempt to analyze the difference image information to attempt to locate any annotations. A process can look to substantially regular features that are substantially linear in an attempt to remove or exclude fold lines. A process can look to features that meet specific criteria, such as having a specific thickness, darkness, dimension, shape, etc. For any feature meeting these criteria, a process can attempt to match the feature to any type of acceptable annotation. For each feature that is determined to sufficiently match an annotation, the process in some embodiments can include at least one step to present the detected annotations to the user for confirmation. If the system inadvertently picked up a feature that the user did not intend, the user can exclude that feature from consideration. If the system missed an annotation, the user can have the ability to perform another step, such as to re-capture an image of the map with a clearer marking or to specify the correct annotation through an interface of the mobile device (or other appropriate device). Once the correct annotations are determined, the system can process the annotations according to the type, size, shape, location, or other such aspect of each location, as discussed elsewhere herein.

In some cases, the difference image can be used to attempt to remove random features from the captured image for the matching process. For example, the difference image could be generated as discussed above, then this difference information could be subtracted from the captured image. By removing random features, the process can get a better determination as to the accuracy of the match. If the images match, the match confidence (or other such value) should increase after removing the added features, while images that do not match should have a match score that either does not significantly change or that actually decreases. Several other such processes can be used as well within the scope of the various embodiments.

In some embodiments the different image can be processed in black and white, grayscale, or using another lower color-bit image, such as an 8-bit or 16-bit color image. Reducing the color depth can reduce the amount of processing and resources needed. In embodiments where annotations are color dependent, using a lower depth image and thresholding the color of various features can help to distinguish between types of annotation, as well as features that do not correspond to annotations. In some embodiments regions of significant deviation can be analyzed, such that stickers or pins with a distinct color and shape are relatively easy to locate.

In some examples, there may not be a match that can be determined for a captured image within an acceptable range, score, etc. As discussed above, one or more secondary processes can be used to attempt to increase the confidence in at least one potential match. For example, words, characters, or unique elements contained in the image can be analyzed to attempt to determine a location corresponding to the captured image. In one example, an optical character recognition process can be used to attempt to recognize names on the map, such as road names or town names. Many processes exist in the art for performing character recognition, and the behavior of these will not be described in detail herein. In some cases, the location of the captured image might be clear from the words in the image, such as an image that includes both the words "Los Angeles" and "Hollywood." Other images may not be quite as clear, however, such as where the image includes the words "Main Street" and "First Street." The presence of these words, however, can help to increase the confidence level in a match. For example, if a unique feature somewhat matches features in three different maps, but only one of those stored maps has a Main Street and a First Street in the image, then the confidence score for the map containing those words can be increased. While such recognition processes can be useful, the processes can be resource intensive and often the quality of the image versus the size of the letters can make it difficult for a recognition process to accurately determine the characters contained in the image. Even if the camera resolution is sufficient, however, a high quality image can be relatively large and thus take longer to upload to a service, etc. Image matching can be preferential in such circumstances as a lower-quality image can be used and results obtained more quickly.

In some embodiments, there can be other information available that can be used to attempt to determine a match for a captured image. For example, the current location of the mobile device can be used to attempt to increase a confidence score. If one potential match corresponds to a location that is near the mobile device and the other potential location is half way across the world, that might be indicative of which map the user is viewing. In some embodiments, recent activity by the user can be stored and/or used to attempt to increase the confidence score. For example, if the user has recently been searching for (or viewing) information about a specific country, location, or point of interest, and one of those matches with one of the potential maps, then that can be indicative or a match as well.

In some embodiments, the location information can be provided to an external party in order to provide additional types of information. For example, a user requesting information about New York might receive offers for Broadway shows, or see other advertising or offers relating to that region. Further, an entity such as an electronic marketplace might accept information about the location in order to provide advertising or suggested products to the user. In one embodiment, a user from Chicago accessing information about New York might receive information from an electronic marketplace or retailer for travel books or guides for New York. If the user from Chicago is visiting Paris, the third party might provide information for French to English dictionaries or other such information. Various other information can be provided as well as can be obtained from third parties, such as weather conditions, exchange rates, etc.

In some embodiments, a user can capture a video image instead of one or more static images. A video image can have certain advantages, as there are more frames to be analyzed which can increase the number of samples, providing the ability to average out noise and increase the accuracy of feature measurements. A video frame can have certain disadvantages in certain circumstances, however, as the additional frames require additional processing and storage capacity, and typically are lower resolution and lower quality than corresponding static images.

Capturing video images can allow movement to be captured, however, which can be used as a type of input in some embodiments. For example, the tip of a stylus, pen, or other similarly shaped instrument could be used to provide input, such as by tracing out a path that the user wishes to follow. In some cases, the stylus could be used to designate points of interest, such as by resting on or tapping a point of interest on the physical map during video capture. The system can detect the position of a point on the instrument, such as an end point, and can determine the points of input, which can be used to generate driving directions or obtain location-specific information as discussed herein. In other embodiments, the captured video can be displayed on the device and the user can provide input via the device, such as by tracing out a route on the displayed video using a stylus and a touch screen, or other appropriate mechanism.

In some cases only a single frame of the video is uploaded for image mapping purposes, and the subsequent or other frames are used for purposes of detecting motion, annotations, etc. If a match cannot be obtained using a single frame, additional frames can be analyzed (e.g., one at a time) until an appropriate match is determined. The resulting directions or information then can be based at least in part upon user motion, such as to directly follow or deviate where advantageous, etc. In some cases, the user might want exact driving directions along the route of movement, while in other cases the motion is a general guideline between points and the process can determine a better route. In some cases, there can be a motion such as a pause or tap to designate a point along the route that is not to be changed, or that is to be included along the route. A motion or pause can also be used to designate the original anchor point and/or other such features.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of providing navigation directions, comprising:
   receiving a query image that includes a representation of a physical map captured by a camera of a computing device;
   determining, using a feature extraction algorithm, at least one first feature vector for the physical map represented in the query image;
   determining, using the feature extraction algorithm, at least one annotation that is marked on the physical map represented in the query image;
   comparing the at least one first feature vector from the physical map to a set of second feature vectors for map information of a map application;
   determining matching map information based at least in part upon the at least one first feature vector matching at least one second feature vector of the set of second feature vectors, the matching map information including geographic location information;
   determining a set of feature points corresponding to the at least one annotation;
   determining a geographic relationship between the set of feature points and the geographic location information;
   determining a set of navigation instructions based at least in part on the geographic relationship; and
   based at least in part upon a current location of the computing device and the set of navigation instructions, displaying on the computing device a determined route from the current location to an identified location in the query image.

2. The computer-implemented method of claim 1, wherein the identified location is determined based on the current location and the annotation.

3. The computer-implemented method of claim 1, further comprising:
   determining the current location of the computing device using a location component of the computing device.

4. A computer-implemented method of providing location-specific information, comprising:
   receiving a query image of a physical map captured by a computing device;
   determining, for the physical map, first features represented in the query image;
   determining at least one annotation that is marked on the physical map represented in the query image;
   comparing the first features to second features for map information of a map application;
   determining matching map information for the query image based at least in part upon at least one first feature matching at least one second feature from the map information, the matching map information including geographic location information;
   determining a set of feature points corresponding to the at least one annotation;
   determining a geographic relationship between the set of feature points and the geographic location information;

determining a set of navigation instructions based at least in part on the geographic relationship; and based at least in part upon a current location of the computing device and the set of navigation instructions, displaying location-specific information on the computing device the location-specific information being related to at least one location in the query image.

5. The computer-implemented method of claim 4, wherein the geographic location information includes at least two geo-coordinates corresponding to specified locations in the matching map information.

6. The computer-implemented method of claim 4, further comprising:
determining a current location of the computing device,
wherein the location-specific information provided to the computing device is based at least in part upon the current location of the computing device.

7. The computer-implemented method of claim 4, wherein the matching map information comprises a plurality of zones, the location-specific information corresponding to at least one of the zones identified in the query image.

8. The computer-implemented method of claim 4, further comprising:
determining a presence of an annotation in the query image, the location-specific information being based at least in part upon a determined location of the annotation.

9. The computer-implemented method of claim 8, wherein the location-specific information is further based at least in part upon a type of the annotation, the type corresponding to at least one of a color, shape, size, text, symbol, and orientation of the annotation.

10. The computer-implemented method of claim 8, wherein annotation by adding the annotation is present on the physical map before capturing the query image or is added digitally after the capturing.

11. The computer-implemented method of claim 10, wherein the annotation corresponds to at least one of a starting point, end point, way point, or point of interest.

12. The computer-implemented method of claim 4, wherein the location-specific information is provided to a device other than the computing device.

13. The computer-implemented method of claim 4, wherein the location-specific information is further based at least in part upon at least one of a type of request, preference information, profile information, and history information.

14. The computer-implemented method of claim 4, further comprising:
when matching map information cannot be determined, utilizing at least one additional process to attempt to match the query image to matching map information.

15. The computer-implemented method of claim 14, wherein the at least one additional process includes an optical character recognition process.

16. The computer-implemented method of claim 4, wherein the query image comprises a video file.

17. A system for providing location-specific information, comprising:
a processor; and
a memory device including instructions that, when executed by the processor, cause the processor to:
receive a query image of a physical map captured by a computing device;
determine, for the physical map, first features represented in the query image;
determine at least one annotation that is marked on the physical map represented in the query image:
compare the first features to second features for map information of a map application;
determine matching map information for the query image based at least in part upon at least one first feature matching at least one second feature from the map information, the matching map information including geographic location information;
determine a set of feature points corresponding to the at least one annotation;
determine a geographic relationship between the set of feature points and the geographic location information;
determine a set of navigation instructions based at least in part on the geographic relationship; and
based at least in part upon a current location of the computing device and the set of navigation instructions, display location-specific information on the computing device the location-specific information being related to at least one location in the query image.

18. The system of claim 17, wherein the instructions, when executed, further cause the processor to:
determine a current location of the computing device,
wherein the location-specific information provided to the computing device is based at least in part upon the current location of the computing device.

19. The system of claim 17, wherein the instructions, when executed, further cause the processor to:
determine a presence of an annotation in the query image, the location-specific information being based at least in part upon a determined location of the annotation.

20. The system of claim 17, wherein the instructions, when executed, further cause the processor to:
provide the location-specific information to a device other than the computing device used to capture the query image.

21. A computer-readable storage medium storing instructions for providing location-specific information, the instructions when executed by a processor causing the processor to:
receive a query image of a physical map captured by a computing device;
determine, for the physical map, first features represented in the query image;
determine at least one annotation that is marked on the physical map represented in the query image:
compare the first features to second features for map information of a map application;
determine matching map information for the query image based at least in part upon at least one first feature matching at least one second feature from the map information, the matching map information including geographic location information;
determine a set of feature points corresponding to the at least one annotation;
determine a geographic relationship between the set of feature points and the geographic location information;
determine a set of navigation instructions based at least in part on the geographic relationship; and
based at least in part upon a current location of the computing device and the set of navigation instructions, display location-specific information on the computing device the location-specific information being related to at least one location in the query image.

22. The computer-readable storage medium of claim 21, wherein the instructions, when executed, further cause the processor to:
determine a current location of the computing device, wherein the location-specific information provided to the computing device is based at least in part upon the current location of the computing device.

23. The computer-readable storage medium of claim 21, wherein the instructions, when executed, further cause the processor to:
determine a presence of an annotation in the query image, the location-specific information being based at least in part upon a determined location of the annotation.

24. The computer-readable storage medium of claim 21, wherein the instructions, when executed, further cause the processor to:
provide the location-specific information to a device other than the computing device used to capture the query image.

* * * * *